CROSS REFERENCE SEARCH ROOM
343-756
JUNCTION BETWEEN CIRCULAR WAVE-GUIDE AND TWO RECTANGULAR WAVE-GUIDES OF DIFFERENT POLARIZATIONS
Filed Oct. 16, 1961
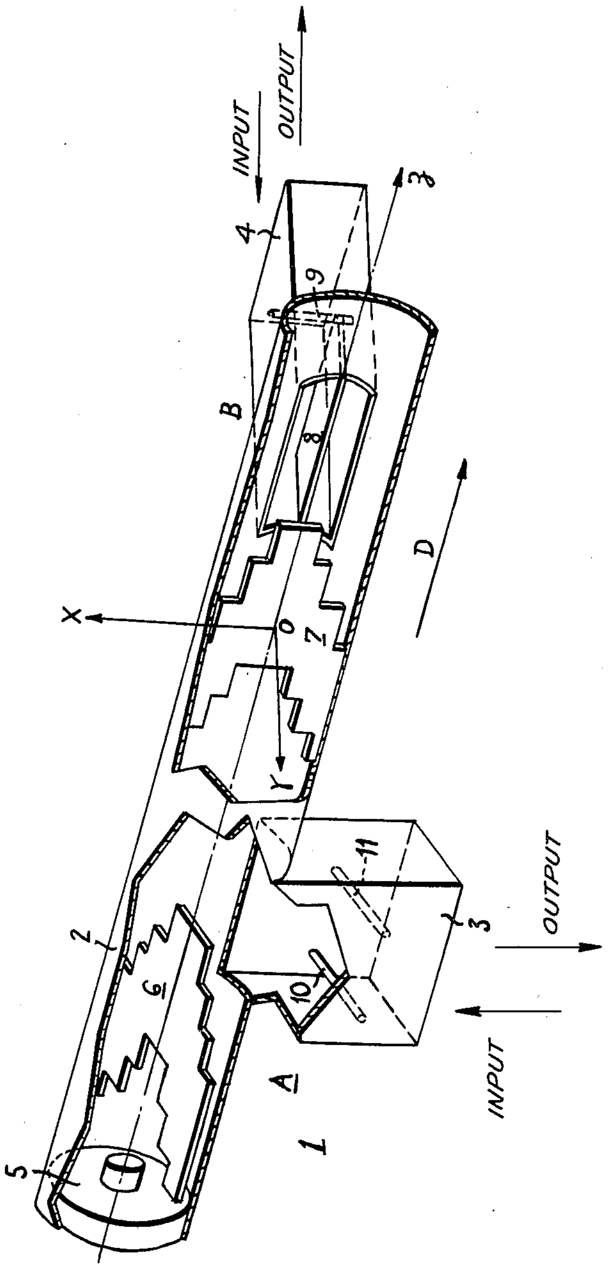
Inventors
M. Grosbois
G. Billon
By Holcombe, Wetherill & Brisebois
Attorneys United States Patent Office 3,201,717

Patented Aug. 17, 1965

3,201,717
JUNCTION BETWEEN CIRCULAR WAVE-GUIDE AND TWO RECTANGULAR WAVE-GUIDES OF DIFFERENT POLARIZATIONS

Marcel Grosbois, Thieu par Mitry-Mory, Seine-et-Marne, and Guy Billon, Brunoy, France, assignors to Compagnie Francaise Thomson-Houston, Paris, France, a corporation of France Filed Oct. 16, 1961, Ser. No. 145,140
Claims priority, application France, Oct. 19, 1960, 841,579, Patent 1,277,376
2 Claims. (Cl. 333—9)

The present invention relates to a junction device between a wave guide of circular cross-section and two wave guides of rectangular cross-section.

It is known that in certain transmission processes the same circular section wave guide is used for simultaneous propagation, according to the $TE_{11}$ mode, of two waves with perpendicular planes of polarization, which are therefore independent one of the other. These two waves are produced in a junction device constituted by a length of guide of aforementioned circular cross-section and two rectangular cross-section guides opening out into the first, these three guides being perpendicular to each other. In such devices, when a short circuit is created by a thin plate, the plane in which the electrical short circuit is efficient (i.e. where the modulus of the reflection coefficient is 1 and the phase difference is $\pi$) does not coincide with the plane of the plate. This plane of the electrical short circuit, or equivalent short circuit plane, is at a short distance from the thin plate, which distance depends on the wave length of the guided wave and also on the dimensions of the plate. Such devices constitute in effect a pair of T junctions, each comprising an input branch consisting of one of the rectangular guides and two lateral arms constituted by the adjacent sections of the circular guides. There is in each T junction a plane which should contain, in one lateral arm, a short circuit, when energy is to be transmitted from the input branch to the other lateral arm. This plane is known as the characteristic plane of that junction.

In the embodiment described in French Patent No. 1,188,267, the circular wave guide is closed at one of its extremities by a piston, the equivalent short circuit plane of which coincides with one of the principal planes of the junction between the circular guide and one of the branches of rectangular cross-section; one of the principal planes of the junction with the second branch being half a wavelength from the plane of the short circuit. This device presents a quasi-perfect decoupling between the two rectangular cross-section branches of the junction, but does not allow for the transmission of a large frequency band because it is necessary to maintain a distance in excess of half a wavelength between the short circuit element and the axis of the second rectangular cross-section guide.

The present invention has for an object to provide a junction device which does not have the above defect.

In accordance with an essential characteristic of the present invention the wave guide of circular cross-section comprises, in proximity to each of the junctions with the wave guides of rectangular cross-section, a reflector for reflecting the wave issuing from the corresponding rectangular guide and which does not disturb the propagation of the wave issuing from the other rectangular guide and polarized perpendicular to the first. It is thus possible to achieve impedance matching within a relatively wide frequency band.

The first of these reflector member is arranged in the circular cross-section wave guide between a terminal device without reflection and the first rectangular cross-section guide with which it is associated. The second member is set between the two rectangular cross-section wave guides. The equivalent short circuit plane of each of the two reflecting members coincides with the principal plane of one of the junctions between the circular cross-section guide and the rectangular cross-section guides.

In order that the present invention may be more readily understood, reference will now be made, by way of example, to the accompanying drawing, which illustrates a preferred embodiment of the invention.

Referring to the drawing, the junction device 1 comprises a guide 2 of circular cross-section and two guides 3 and 4 of rectangular cross-section. The axes of these three guides are respectively parallel to the axes ($Oz$, $Ox$ and $Oy$) of a trirectangular trihedron, that is the axes of the guides are mutually perpendicular. The broader dimension of the end of each of the rectangular cross-section guides 3 and 4 communicating with the circular section guide 2 is parallel to the axis $Oz$ of the circular section guide 2. One of the extremities of the guide 2 comprises a non-reflecting terminal device 5.

A member 6 is placed in the guide 2 betwen the device 5 and the junction between guides 2 and 3 (Junction A). The member 6 reflects a wave having a plane of polarization perpendicular to the broad surfaces of the guide 3, while it does not disturb the propagation of a wave having a plane of polarization parallel to the broad surfaces of this guide. It is obvious that under these conditions the member 6 reflects a wave issuing from the guide 3 in the direction D, while it does not modify the propagation of a wave issuing from the guide 4.

The member 6 is constituted by a metallic plate set diametrically in the guide 2. The shape of this plate is symmetrical in relation to the axis $Oz$. It has a fairly constant longitudinal dimension whereas its transverse dimension has a minimum value at its two extremities and a maximum value in the middle. In the drawing the member 6 is shown as having front and rear edges which are stepped.

Matching members in the form of bars 10 and 11 are arranged in the guide 3.

A member 7 is arranged in the guide 2 between the junction A and the junction between the guides 2 and 4 (Junction B), that is to say between the two rectangular cross-section wave guides. The member 7 reflects a wave having a plane of polarization perpendicular to the broad surfaces of guide 4 while it does not disturb the propagation of a wave having a plane of polarization parallel to the broad surfaces of this guide. In other words, the member 7 reflects a wave issuing from the guide 4 in the direction D, while it does not modify the propagation of a wave issuing from the guide 3. The member 7 is identical to the member 6 but is perpendicularly orientated with respect thereto.

Two impedance matching members are arranged in the guide 4. These are a flat thin conductor 8, which is located parallel to the broad surfaces of the guide 4 near the opening of said guide, and a bar 9, which fulfills the function of an inductance.

We shall now study the functioning of the junction device when two waves of $TE_{01}$ mode are sent, respectively, into the guides 3 and 4 towards the circular cross-section guide 2, these waves exciting, in the latter guide, waves of $TE_{11}$ mode, the polarization planes of which are perpendicular. A wave $\alpha_3$ propagating in the guide 3, according to the $TE_{01}$ mode, towards the guide 2 generates in the latter a wave $\beta_3$ of $TE_{11}$ mode, the plane of polarization of which is parallel to the axis $Oy$. This wave is reflected by the member 6 which then fulfills the function of a short circuit element, and the wave propagates in the direction D. The member 7 provokes no transmission disturbance as this member is orientated perpendicular to the polarization plane of wave $\beta_3$. This plane being parallel to the axis $Oy$, the guides 2 and 4 are perfectly decoupled for this wave $\beta_3$. As a result of the presence of member 8 in the opening of the guide 4, the propagation of the wave $\beta_3$ undergoes almost no modification when passing in front of this opening. Then the wave $\beta_3$ reaches the extremity of the circular cross-section guide 2.

A wave $\alpha_4$ propagating according to the $TE_{01}$ mode, in the guide 4, towards guide 2 generates in the latter a wave $\beta_4$ of $TE_{11}$ mode which has a plane of polarization parallel to the axis $Ox$. This wave is reflected by the member 7, which then fulfills the function of a short circuit element, and propagates in the direction D. Then the wave $\beta_4$ reaches the extremity of the guide 2.

In summary, to the wave $\alpha_3$ incident in the guide 3 corresponds a wave $\beta_3$ which propagates in the exit branch of the guide 2 with a plane of polarization parallel to $Oy$, whereas a wave $\beta_4$, which also propagates in the exit branch of the guide 2, but with a plane of polarization parallel to $Ox$, corresponds to the wave $\alpha_4$ incident in guide 4.

Conversely, if a wave propagating in the interior of the guide 2 in the opposite direction to that of the arrow D has two components of $TE_{11}$ mode, $\beta'_3$ and $\beta'_4$, the polarization planes of which are respectively parallel to the axes $Oy$ and $Ox$, two waves $\alpha'_3$ and $\alpha'_4$ of $TE_{01}$ mode will be formed in the guides 3 and 4.

The component $\beta'_4$ is reflected by the member 7 and for this reason excites a wave $\alpha'_4$ in the guide 4. Finally the propagation of the component $\beta'_3$ is not disturbed by the member 7, although this component is reflected by the member 6. The wave $\beta'_3$ then excites a wave $\alpha'_3$ in the guide 3.

The two way junction device which has just been described thus makes it possible to excite, in the circular wave guide, two waves, which propagate themselves independently according to the $TE_{11}$ mode, by sending two waves of $TE_{01}$ mode into the rectangular cross-section guides. It is also possible to excite waves of the same type in the rectangular cross-section guides by sending two wave of $TE_{11}$ mode into the circular guide, the polarization planes of which are mutually perpendicular.

The two transmission paths which comprise this device are very efficiently decoupled, the decoupling being in excess of 50 db, and impedance matching is achieved within a large frequency band.

The applicants have brought into being various junction devices, the operating frequency of which is 10,000 Mc./s. Devices of this type can be used for all frequency bands used for guides.

The junction device can be used to construct rotating two way joints of similar structure to that which is the object of French Patent No. 1,206,401. It can also be used to construct a duplexer.

According to a variation of the invention, the structure of the device shown in FIGURE 1 may be slightly modified if the appearance of parasitical resonance phenomena, due to reflection of the energy incident towards the closed end of extremity 5 towards the members 6 and 7, is not feared. In this case the terminal device 5 is replaced by a short circuit plate, a shorter reflector member 6 is used, and the length of the guide 2 can be reduced without drawback. The dimensions of the junction device are thus reduced.

We claim:

1. In a wave guide system, a junction arrangement between a first wave guide of rectangular cross-section, a second wave guide of rectangular cross-section, and a third wave guide of circular cross-section communicating with the ends of said first and second wave guides at positions spaced axially along said third wave guide, the axis of each guide being perpendicular to those of both the others and the broader dimension of the end of each rectangular guide communicating with the circular guide being parallel to the axis of the circular guide, said arrangement comprising a reflection-free device closing one end of said circular guide, a first member located in the circular guide between said end device and the nearest rectangular guide, said member reflecting a first wave whose polarization plane is perpendicular to the broader dimension of said nearest rectangular guide while not disturbing the propagation of a second wave whose polarization plane is perpendicular to that of said first wave, and a second member similar to the first member located in the circular guide between the positions at which said circular wave guide communicates with said rectangular guides, said second member being in a direction perpendicular to that of said first member, the equivalent short-circuit plane of each of said members being, respectively, in coincidence with one of the characteristic planes of the assemblies constituted by the circular guide and the first rectangular guide on the one hand and by the circular guide and the second rectangular guide on the other hand, each of said first and second members being constituted by a conducting sheet diametrically disposed in the circular guide, said sheet having a shape symmetrical with respect to its longitudinal axis, its longitudinal dimension being approximately constant and its transverse dimension being at its minimum at both ends of the sheet and at its maximum at the center of said sheet.

2. A wave guide junction device, comprising two wave guide portions of rectangular cross-section and a wave guide portion of circular cross-section, the axis of each guide portion being perpendicular to those of both the others and the rectangular guide portions communicating with the circular guide portion at spaced positions therealong with the broader dimensions of the communicating ends of said rectangular guide portions parallel to the axis of said circular guide, a non-reflecting device closing one end of said circular guide portion, a first member located in said circular guide portion between said device and the nearest rectangular guide portion, said member reflecting a first wave whose polarization plane is perpendicular to the broader dimension of said nearest rectangular guide portion while not disturbing the propagation of a second wave whose polarization plane is perpendicular to that of said first wave, and a second member similar to the first member located in said circular guide portion between the positions at which said circular guide portion communicates with said rectangular guide portions, said second member being disposed in a direction perpendicular to that of said first member, and the equivalent short-circuit plane of each of said members being, respectively, in coincidence with one of the characteristic planes of the assemblies constituted by said circular guide and one of said rectangular guide portions on the one hand, and by said circular guide and the other rectangular guide portion on the other hand, each of said first and second members being constituted by a conducting sheet diametrically disposed in the circular guide, said sheet having a shape symmetrical with respect to its longitudinal axis, its longitudinal dimension being approximately constant and its transverse dimension being at its minimum at both ends of the sheet and at its maximum at the center of said sheet.

References Cited by the Examiner

UNITED STATES PATENTS

| | | | |
|---|---|---|---|
| 2,606,248 | 8/52 | Dicke | 333—21 |
| 2,961,618 | 11/60 | Ohm | 333—9 |
| 2,972,722 | 2/61 | Ohm | 333—9 |
| 3,048,844 | 8/62 | Ashby | 343—756 |

OTHER REFERENCES

Ragan: Microwave Transmission Circuit, M.I.T. Radiation Laboratory Series, vol. 9, 1948, pages 397–398 of interest.

HERMAN KARL SAALBACH, *Primary Examiner.*